April 1, 1924.
M. KAMMERHOFF
ELECTRICAL TESTING SET
Filed July 16, 1920
1,489,127
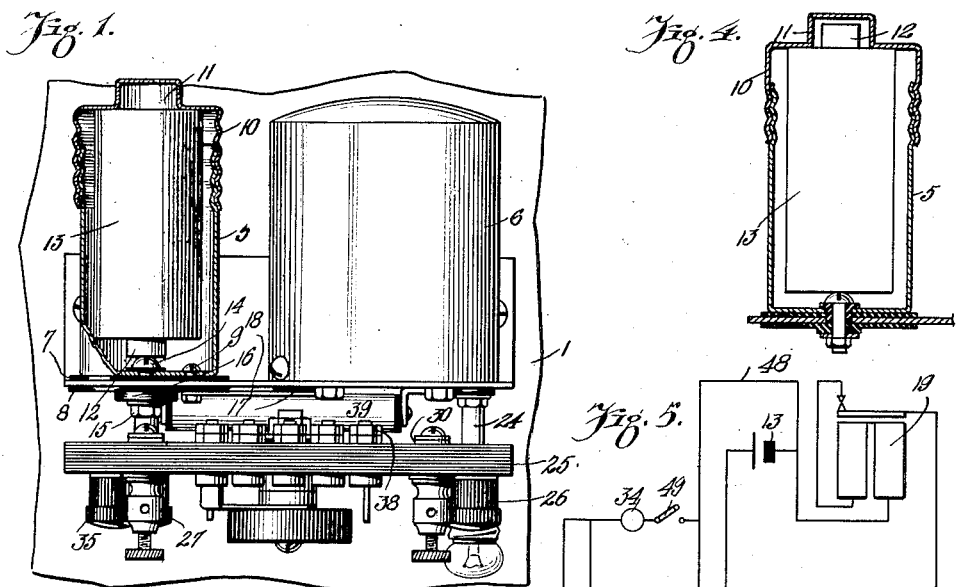
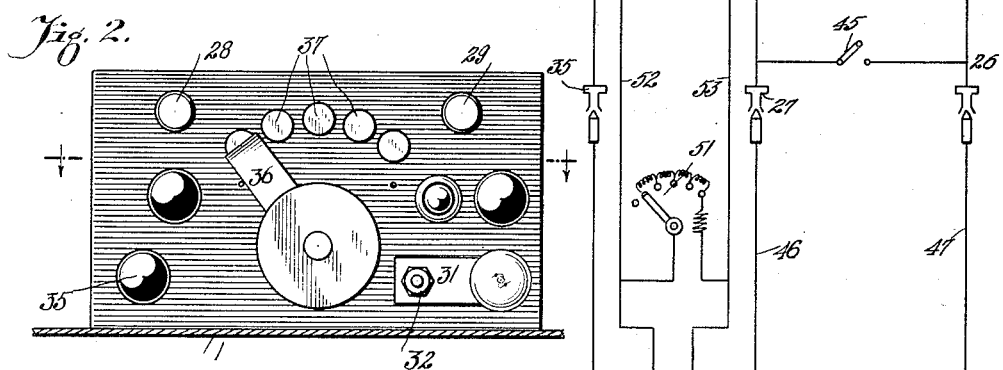
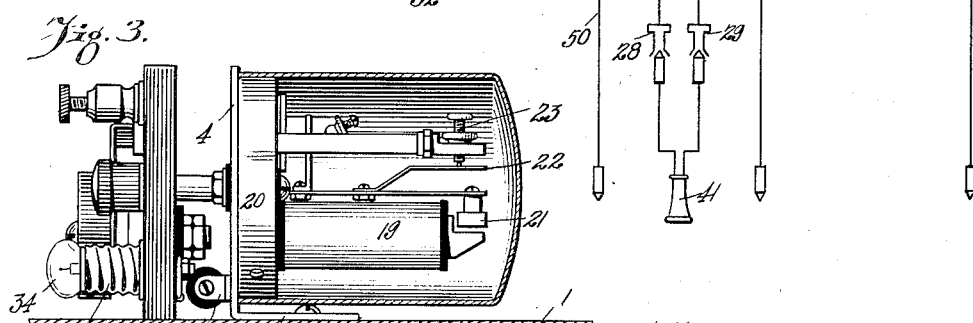
INVENTOR
MENO KAMMERHOFF
ATTORNEYS Patented Apr. 1, 1924.

1,489,127

UNITED STATES PATENT OFFICE.

MENO KAMMERHOFF, OF ORANGE, NEW JERSEY.

ELECTRICAL TESTING SET.

Application filed July 16, 1920. Serial No. 396,698.

*To all whom it may concern:*

Be it known that I, MENO KAMMERHOFF, a citizen of the Republic of Germany, and a resident of Orange, in the county of Essex and State of New Jersey, have invented a new and Improved Electrical Testing Set, of which the following is a full, clear, and exact description.

This invention relates to an electrical testing set, and has particular reference to a portable electrical testing set.

An object of the invention is to provide a portable electrical testing set which is simple, compact, and capable of being used to test electrical circuits, particularly in automobiles, for broken circuit wires, grounds, and faulty insulation.

Another object of the invention is to provide a testing set which is portable and at the same time is capable of giving a plurality of indications of different degrees of sensitiveness, whereby defects of different characters in the circuit under test may be accurately indicated.

Another object is the provision of a set in which the parts are mechanically combined to permit the occupation of a minimum amount of volume and at the same time be capable of ready manipulation by persons inexperienced with electrical circuits.

A further object relates to means whereby the battery, used in connection with the set, will not operate unless inserted properly within its casing.

A still further object resides in the provision of the particular construction and arrangement of parts to be hereinafter described and claimed and shown in the accompanying drawing.

This invention comprises in general a small, portable metallic base which may be provided with a suitable cover. On this base is mounted a small battery, preferably a small flash light dry battery, and an electrical buzzer. The buzzer and battery are mounted on a suitable support and may be disposed with their axes parallel to the base, whereby a minimum space is taken up by these pieces of apparatus. A plate of insulating material is disposed adjacent the support for the battery and buzzer and is provided with suitable binding posts whereby electrical connections between the battery and buzzer may be made. A small electric lamp is also disposed on this insulating plate and connections may be made whereby the battery may be connected with the lamp instead of the buzzer. A variable rheostat is also mounted on this insulating plate and connections may be made thereto to place the lamp and rheostat in parallel. Binding posts are also provided on this insulating plate or panel board whereby connection may be made to a telephone headpiece. These binding posts are suitably connected in parallel with the lamp.

The electrical connections of this set are such that if outside terminal wires are connected to two of the binding posts and applied to the circuit to be tested, the battery current will be connected to the buzzer. On the other hand, if certain other terminals are connected with the outside circuit wires the connections are such that the battery current will be applied through the lamp. Connections are also made whereby the variable rheostat may be introduced into the circuit in parallel with the lamp or in parallel with the telephone headpiece binding posts, so that when outside circuit wires are connected to the proper binding posts on the panel board an indication of the condition of the circuit under test may be given by the lamp or by the telephone and an approximation of the amount by which the circuit is defective, such as in the case of faulty insulation, can be had by the adjustment of the variable rheostat.

The invention further comprises the particular construction of the casing for the battery used in connection with this set whereby the end pole of the battery, when the battery is inserted improperly within its casing, does not make an electrical contact, so that the electrical circuit is not operative until the battery is properly placed within its casing.

The invention further comprises switching means disposed on the panel board and adapted to close the circuit of the battery and buzzer whereby the buzzer may operate independently of a connection therewith with outside wires.

The invention further comprises the particular arrangement and construction of parts which are to be hereinafter described and claimed and which are shown in the accompanying drawing.

The invention is illustrated in the drawing, of which—

Figure 1 is a plan view of the set with a part of the battery casing removed;

Figure 2 is a front elevation of the set;

Figure 3 is a side elevation of the device with the buzzer casing cut away;

Figure 4 is a partial sectional view taken through the battery casing and showing the battery improperly inserted in its casing;

Figure 5 is an electrical circuit diagram of the set; and

Figure 6 is a detail view of the switching arrangement for independently operating the buzzer.

Aside from house wiring for light and power, the installation and repair of which is generally carried out by experts, there are numerous cases where less experienced people wish or have to do work of an electrical nature, as, for example, the installation and repair of house telephones, bells, buzzers, etc. Furthermore, there is a large and growing field where laymen are compelled to handle electric wiring and do testing and repair work to some extent. This field relates to the complicated electrical equipment of modern automobiles. In order to give not only the expert in things electric but also the layman proper means to perform tests of a simple nature on electrical circuits, the device constructed in accordance with my invention has been provided.

This device, as embodied in the preferred form of my invention, comprises a base portion 1, which may be of any suitable form, and is composed of metal or insulating material such as wood, hard rubber or the like. This base, upon which the apparatus of the testing set is mounted, may be provided with any suitable cover (not shown), which may be attached thereto in any desired manner. A plate made of metal or any suitable material is mounted on the base 1 and attached thereto by means of a flange portion 3. The main portion 4 of the plate extends vertically thereof and forms a support for a battery casing 5 and a buzzer or signal indicating device 6. The battery casing 5 is insulatingly spaced from the plate portion 4 by means of washers 7 and 8 of some suitable insulating material. The casing is mounted on the plate portion 4 by being fastened thereto by means of screws 9 which pass through suitable apertures in the plate portion 4 and are connected at one end to the casing 5 and at the other end bear on one of the washers 7 and 8 above mentioned. The casing 5 is provided with a cover 10 which in its end face is provided with a cuplike recess 11 which, in diameter, in considerably larger than the diameter of a projecting pole 12 extending from one end of a battery cell 13 adapted to be contained within the casing 5. This pole 12 is normally adapted to make contact with a terminal screw 14 located in the bottom of casing 5 and which insulatingly extends through an opening in the bottom of casing 5 and is clamped in place by means of nuts 15 which bear against the insulating washers 16.

The buzzer casing 6 is similarly fastened to the plate portion 4, and one terminal 17 of the buzzer is connected to the screw 9 of the battery casing by means of a metallic strip 18. The buzzer, shown more particularly in Figure 3, comprises a pair of coils such as 19 mounted on a base portion 20 having an armature 21 which carries a resilient spring member 22 which, due to the movement of the armature 21, makes and breaks contact with a terminal 23. This buzzer is described and set forth more particularly in detail in my copending application, Serial No. 331854, filed October 20, 1919, entitled Self-contained battery-driven bell or buzzer. The other pole of the buzzer is connected to a terminal shaft 24. This shaft extends from within the buzzer casing to contact with the above-mentioned pole, and insulatingly through the plate portion 4 and extends at its outer end through an insulating plate or panel board support 25. The outer end of the shaft 24 is formed in the shape of a binding post 26 to which circuit connections can be made. The above-mentioned screw 14, which forms a terminal contact for the pole 12 of the battery cell 13, also extends through the panel board 25 and is connected at its outer end to a binding post 27. The panel board or insulating plate 25 is spaced from the plate portion 4 a suitable distance and is supported in place by the engagement therewith of the shaft 24 and the shaft of the screw 14.

On the front face of the panel board 25 two small binding posts 28 and 29 are provided for connection to a telephone instrument. The binding post 29 at the back of the board is connected by a strip 30 with a metal plate 31 by the intermediary of a contacting threaded screw bolt 32. This metallic plate carries a socket 33 adapted to receive a small electric lamp 34. The usual inner central contact of the lamp socket 33, which is not shown, is connected by a wire, also not shown, to a binding post 35. A variable rheostat arm 36 is mounted on the front of the panel board and is adapted to pass over a plurality of contacts 37 which, at the rear of the board, are provided with terminals 38 whereby they are adapted to be connected in a well-known manner to a plurality of sections of a high-resistance coil 39 which is mounted on the plate portion 4 in suitable brackets 40. This resistance coil is preferably made of high-resistance wire, for instance, No. 40 B. and S. wire, and the sections which are connected to the contacts 37 may contain three ohms, seven ohms, ninety ohms, nine hundred ohms, and perhaps as high as ten thousand ohms, respectively.

A telephone headpiece 41, shown diagrammatically in Figure 5, is used in connection with this set and an instrument is preferably used which has a resistance of about eighty ohms, which is particularly adapted for use with this set. In Figure 6 is shown the panel board 25 with the binding posts 26 and 27 and the plate portion 4. The shaft connection between the binding post 27 and the terminal 14 of the battery is provided with a spring plate 42 which is pivoted to it at one end. This spring plate is connected to the terminal of binding post 27 by means of spacing nuts 43. A contact piece 44 is similarly fastened to the terminal shaft of binding post 26, and a push button 45 is mounted on a panel board 25 adjacent the binding post 26 and connected at its rear end with the spring plate 42, whereby the movement of push button 45 will make contact between the spring plate 42 and the contact 44. This connection establishes a circuit through the battery and buzzer independent of the binding posts 26 and 27.

In Figure 4 the battery cell 13 is shown placed within the casing 5 in a reverse position with the pole 12 thereof extending into the cuplike recess 11 of the cover 10 of the casing 5. Since this cell is formed in the usual manner with insulation on the end face of the cell 13 around the pole 12, this face in contact with the cover 10 does not make an electrical circuit. Moreover, the diameter of the recess 11 is considerably greater than the diameter of the pole 12 so that this pole does not make contact. Therefore, it is perceived that unless the cell 13 is inserted in the casing 5 in the correct manner, which is shown in Figure 1, an electrical circuit is not established.

In Figure 5 the electrical circuit diagram is set forth and shows the connection between the various pieces of apparatus which it has been deemed unnecessary to show in the other figures, in order that the various figures might be as clear and simple as possible. In this figure the buzzer coils 19 are shown in series with the battery cell 13, the ends of this circuit being connected to the binding posts 26 and 27. The push button 45 is shown in the form of a switch connected across the circuit back of the binding posts 26 and 27 so that when the switch 45 is closed the buzzer 19 is operated regardless of any connections which may have been made to outside circuits through the binding posts 26 and 27. By providing this push button and its connections on the testing set, this arrangement can be used as a calling device or for any other similar purpose. If it is desired to use the buzzer alone as a signal or indicating means for testing outside circuits, circuit wires such as 46 and 47 are connected to the binding posts 26 and 27. These circuit wires may be connected on opposite sides of a point in a circuit to to be tested concerning the continuity of which there is some doubt. In a well-known manner, if the wire being tested is continuous and not broken, the buzzer will indicate this fact. These circuit wires 46 and 47 may also be used to test for leakage from a conductor through its insulation or between an electrical circuit wire and the ground. If for any reason it is desired to use any other indication than the buzzer, I have provided a lamp 34 which, as shown in the diagram, is connected to the plus pole of the battery by a wire 48 and on the other side to a binding post 35. Any suitable form of switch, such as shown at 49, may be placed in circuit with the lamp, although the purpose of this switch may be achieved by unscrewing the lamp in its socket. It is readily perceived, therefore, that by connecting circuit wires 46 and 50 between the binding posts 27 and 35 that the lamp 34 may be used as an indicating device for testing any desired circuit condition. A variable rheostat, which I have structurally described above and which I shall denote on this diagram by the numeral 51, is connected in parallel with the lamp 34 by means of wires 52 and 53. Binding posts 28 and 29 are also shown connected in parallel with the lamp 34 and the variable rheostat 51. A telephone headpiece 41 can, therefore, be connected in parallel with the rheostat 51 and the lamp 34 by connecting its terminals to binding posts 28 and 29.

In the operation of the device the use of the buzzer and battery have been described; the use of the lamp with battery, by connecting the circuit to be tested with binding posts 27 and 35, is sometimes preferable since the lamp will indicate a circuit, where the buzzer would not operate owing to the fact that the resistance of the circuit is too high. If a still more sensitive indication is desired on account of the resistance conditions of the circuit to be tested, a telephone instrument, such as the instrument 41, may be used instead of the lamp. With a dry battery, consisting of one cell, and a telephone receiver of about 80 ohms, resistances up to about 250,000 ohms and higher can be tested; in other words, a click in the telephone receiver will be noticeable as long as the resistance of the circuit to be tested is below about 250,000 ohms. It is, of course, possible, often desirable, to use dry batteries of more than one cell, in which case the range of the tester will be enlarged corresponding to the number of cells employed. With an 80 ohms telephone receiver and a dry battery of two cells, for instance, circuits with a resistance up to about 500,000 ohms and higher can be tested, and so forth.

The usefulness of the tester is increased if the telephone receiver is used in combination with a lamp, shown at 34 in Figure 5. With such an arrangement, either the buzzer or the lamp or the telephone alone can be used as described, or the telephone can be used connecting it parallel to the lamp. Assuming that the lamp has a resistance of about eight ohms, the telephone of about 80 ohms, it is clear that the telephone, if connected parallel to the lamp, will receive about one-tenth of the current circulating through a given circuit. If, then, as said before, a telephone of 80 ohms in combination with one dry cell will indicate resistances up to about 250,000 ohms, that same telephone, when used parallel to a lamp of about 8 ohms, will indicate resistances up to about 25,000 ohms.

The sensitiveness of the tester can be still more increased and its range of usefulness enlarged by placing parallel to the lamp a variable rheostat, like that shown in 51 of Figure 5. If, for instance, the steps of the variable rheostat 51 be 8—20—80 ohms, the current circulating through the telephone receiver of 80 ohms will be about $\frac{1}{10}$, $\frac{1}{5}$ $\frac{1}{2}$ from that going through the main circuit. Provided we use the same example as before and presume that the telephone of 80 ohms will indicate resistances up to 250,000 ohms, it will indicate resistances up to 125,000 ohms, if connected parallel to a rheostat of 80 ohms. Consequently, the tester can be used to detect with a sufficient degree of exactness the condition of a given circuit, if provided with a variable rheostat, as in 51, Figure 5. It is, of course, possible to use resistances for the steps of the rheostat different from those mentioned in the examples of this description. It is, furthermore, possible to use telephone receivers of higher resistance than 80 ohms. For practical conditions, the steps of the variable rheostat will preferably be marked in terms of resistances to be tested like the scale of an amperemeter, voltmeter, etc., which has been previously calibrated. If, then, the handle of the rheostat, for instance, be placed on the contact, marked 125,000 ohms, and the click in the telephone, when testing a certain circuit, is still audible, it will indicate that the resistance is less than 125,000 ohms; if, then, the handle of the rheostat be placed on the next contact, marked by, say, 50,000 ohms, and no click in the telephone is audible, it will prove that the resistance of the circuit is between 50,000 and 125,000 ohms.

It is apparent, therefore, that I have provided in a simple and compact unit, a testing set which is capable of being easily carried around in a pocket or in the tool kit of an automobile, which is capable of being used to indicate faults in circuits of both high and low resistances. The fact that all the connections which have to be made in order to use this device are mounted on the panel board in front of the device, makes it very easy for one not necessarily expert in electrical matters, to use the device. The fact that three different kinds of indications can be had from this one set also adapts it for use under a variety of conditions.

What I claim is:

1. An electrical testing device comprising a base, a battery, a buzzer, a lamp, and a resistance coil on said base, parallel connections between the resistance coil and the lamp, adjusting means on said base in circuit with said connections, binding posts on said base adapted to receive testing circuit wire, and connections between the binding posts, the lamp, the buzzer and the battery.

2. An electrical testing device comprising a base, a battery, a buzzer, a lamp, and a resistance coil on said base, parallel connections between the resistance coil and the lamp, binding posts on said base adapted to receive connections to a telephone receiver, wires connecting the lamp and said binding posts in parallel, binding posts on said base to receive testing circuit wires, and connections between said last-mentioned binding posts, the lamp, the buzzer and the battery.

3. An electrical testing device comprising a base, a battery, a buzzer, a lamp, and a resistance coil on said base, parallel connections between the resistance coil and the lamp, an adjusting means on said base in circuit with said connections, binding posts on said base adapted to receive connections to a telephone receiver, wires connecting the lamp and said binding posts in parallel, binding posts on said base to receive testing circuit wires, and connections between the last-mentioned binding posts, the lamp, the buzzer, and the battery.

4. An electrical testing device comprising, on a portable base, a plurality of apparatus comprising a buzzer, a battery and a lamp, all connected on one side of a common circuit point, binding posts connected to the other side of said apparatus, and a resistance in parallel with said lamp.

5. An electrical testing device comprising, on a portable base, a plurality of apparatus comprising a buzzer, a battery and a lamp, all connected on one side of a common circuit point, binding posts connected to the other side of said apparatus, and a telephone receiver in parallel with the lamp.

6. An electrical testing device comprising, on a portable base, a plurality of apparatus comprising a buzzer, a battery and a lamp, all connected on one side of a common circuit point, binding posts connected to the other side of said apparatus, a resistance in parallel with said lamp, and connections for a telephone receiver in parallel with the resistance.

7. An electrical testing device comprising a base, a supporting plate fastened to said base and disposed vertically thereto, a battery and a buzzer mounted on said plate with their axes parallel to the base, an insulating terminal panel board disposed adjacent said plate, binding posts, a lamp, and a variable rheostat arm on the panel board, and a resistance coil disposed between the panel board and the plate.

MENO KAMMERHOFF.